United States Patent
Hanley et al.

(10) Patent No.: US 6,542,669 B1
(45) Date of Patent: Apr. 1, 2003

(54) ENHANCED COUPLING ARRANGEMENT FOR AN OPTOELECTRONIC TRANSDUCER

(75) Inventors: Michael Francis Hanley, Rochester, MN (US); Glen Walden Johnson, Yorktown Heights, NY (US); Gerald Daniel Malagrino, Jr., Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 09/666,790

(22) Filed: Sep. 21, 2000

(51) Int. Cl.[7] ................................. G02B 6/42
(52) U.S. Cl. ..................... 385/38; 385/88; 385/91
(58) Field of Search .................. 385/88–94, 38

(56) References Cited

U.S. PATENT DOCUMENTS

| | | | | | |
|---|---|---|---|---|---|
| 4,610,746 A | * | 9/1986 | Broer et al. | ............ | 156/275.5 |
| 4,653,847 A | * | 3/1987 | Berg et al. | ............ | 68/23.2 |
| 4,730,198 A | | 3/1988 | Brown et al. | | |
| 5,912,913 A | * | 6/1999 | Kondow et al. | ............ | 372/45 |
| 5,959,315 A | * | 9/1999 | Lebby et al. | ............ | 257/88 |
| 6,081,638 A | * | 6/2000 | Zhou | ............ | 372/108 |
| 6,337,760 B1 | * | 1/2002 | Huibers et al. | ............ | 359/223 |
| 6,356,686 B1 | * | 3/2002 | Kuczynski | ............ | 385/14 |

* cited by examiner

*Primary Examiner*—Hemang Sanghavi
*Assistant Examiner*—Omar Rojas
(74) *Attorney, Agent, or Firm*—Rabin & Berdo, PC; Robert H. Berdo, Jr.

(57) ABSTRACT

A coupling arrangement includes a vertical cavity surface emitting laser. A carrier has the vertical cavity surface emitting laser affixed thereto. An optical coupler is coupled to the vertical cavity surface emitting laser, and has a plurality of optical fibers which receive light emitted from the vertical cavity surface emitting laser. The vertical cavity surface emitting laser is separated from the optical coupler by a gap and is free of direct contact with the optical coupler. The gap is less than about 50 microns, and is greater than zero microns. A curable adhesive is disposed in the gap for coupling the vertical cavity surface emitting laser to the optical coupler. The adhesive has a viscosity that defines a size of the gap.

23 Claims, 3 Drawing Sheets

ENHANCED COUPLING ARRANGEMENT FOR AN OPTOELECTRONIC TRANSDUCER

BACKGROUND OF THE INVENTION

1. Field of the Invention

The present invention relates to an enhanced coupling arrangement for an optoelectronic transducer, and in particular, to an enhanced coupling arrangement that reduces and/or controls a gap between an optical coupler for an optical device, such as an optical fiber, and a surface emitting device, such as a vertical cavity surface emitting laser, for example.

2. Background Information

Computer and communication systems are now being developed in which optical devices, such as optical fibers, are used as a conduit (also known as a wave guide) for modulated light waves to transmit information. These systems include at least a light emitter, and an optical coupler that connects the optical device to the light emitter. A generic term of either a light emitter or a light detector is an "optoelectronic transducer."

As an example, optoelectronic transducers convert electrical signals to or from optical signals; the optical signals carry data to a receiver from a transmitter at very high speeds. Typically, the optical signals are converted into, or converted from, associated electrical signals using known circuitry. Such optoelectronic transducers are often used in devices, such as computers, in which data must be transmitted at high rates of speed.

In order to transmit the optical signals, the light emitter is typically either a light emitting diode (LED) or laser emitter. Conventionally, a photodiode is used to receive the optical signals. Optical fibers, which collectively form a fiber-optic cable, may be coupled to the respective LED or laser, and the photodiode, so that the optical signals can be transmitted to and from other optoelectronic transducers, for example.

The optoelectronic transducers are normally located on either input/output cards or port cards that are connected to an input/output card. Moreover, in a computer system, for example, the input/output card (with the optoelectronic transducer attached thereto) is typically connected to a circuit board, for example a mother board. The assembly may then be positioned within a chassis, which is a frame fixed within a computer housing. The chassis serves to hold the assembly within the computer housing.

Typically, there are two different types of light emitters which may be utilized with optoelectronic transducers. These include, in general, edge emitters and surface emitters. Edge emitters typically have a light emitting portion which is located on an edge of a chip, and typically have an active area that may be, for example, half a micron by four microns in size, for a total area of about 2 square microns. In contrast, surface emitters, such as vertical cavity surface emitting lasers (VCSEL), conventionally have an active area that is substantially larger than the active area of an edge emitter. The active area of a surface emitter is typically around 20 microns in diameter, so as to provide for about, for example, 400 square microns of active area.

Moreover, and in contrast to a typical edge emitter, the conventional surface emitter has an active area that is surrounded by inactive portions. This allows further devices to be placed immediately adjacent to the surface emitter, using the inactive portions as bearing surfaces. Moreover, and in contrast to a typical edge emitter, surface emitters commonly include coatings, such as silicon dioxide or other nitrides, which are utilized for passivation purposes.

Further, with the conventional VCSEL, the light is emitted in a conical beam vertically from the surface of the chip. Furthermore, the conventional VCSEL allows for integrated two-dimensional array configurations. For example, the VCSELs can be arranged in a linear array, for instance 12 surface emitters spaced about 250 microns apart, or in area arrays, for example, 16×16 arrays or 8×8 arrays. Of course, other arrangements of the arrays are also possible. Nevertheless, linear arrays are typically considered to be preferable for use with optoelectronic transducers, since it is generally considered easier to align the optical fibers which collect the light emitted from the VCSELs in a linear array, than in an area array. Moreover, it is also conventional not to arrange the VCSELs in any sort of array whatsoever, but instead utilize the VCSELs singly.

It is important to ensure that as much of the light emitted from the light emitters reaches the respective optical fibers. However, the light emitted from the light emitters always diverges. This divergence may cause some of the emitted light not to reach the optical fibers, thus decreasing the efficiency of the transmission. Thus, the gap that must be bridged between the emitter and the optical fibers must be carefully controlled.

Moreover, as the emitted light diverges, it becomes increasingly more difficult to align the emitted light with the respective optical fibers. That is, if the emitted light beam has a diameter that is smaller than a diameter of the respective optical fiber, there is a certain acceptable margin of error in the alignment process. For instance, the respective light emitter may be shifted slightly off-center relative to the respective optical fiber, with the emitted light still impinging completely upon the optical fiber. On the other hand, if the emitted light beam has a diameter that is, due to its divergence, the same as, or larger than the diameter of the respective optical fiber, any shifting of the light emitter away from center relative to the respective optical fiber will cause some of the emitted light to miss the optical fiber.

In order to reduce any misalignment between the optical fibers and the light emitters, so as to ensure that the emitted light does not partially or completely "miss" its intended target, the light emitters may be either actively or passively aligned. For a device to be actively aligned, the light emitter is typically turned on and the other elements aligned with the light emitter while the device is activated. By using this approach, each device produced is individually aligned. Obviously, this is not preferable if the devices are to be mass produced. However, when the positional tolerances are very small, active alignment may be the only acceptable way to ensure that the light emitters are aligned with the optical fibers, especially when there is a large divergence in the emitted light beams.

Alternatively, passive alignment techniques utilize jigs or other manual operations to align the light emitters to the respective optical fibers. Passive alignment techniques are less accurate that active alignment techniques, and thus work best when the positional tolerances are larger, that is, when some shifting of the light emitters relative to the respective optical fibers can be tolerated.

From the foregoing, it is clear that it is desirable to reduce the divergence of the light beam emitted from the light emitters as much as possible. One way to reduce the divergence of the light beam is to move the light emitter as close as possible to the optical fibers. However, due to the fragile nature of the light emitters, it is desirable that the surface of the light emitter does not directly contact the optical fibers, especially during the alignment process. Moreover, it is further desirable that the light emitters be fixed relative to the optical fibers, so as to maintain their relative positions to each other.

Referring to FIGS. 1 and 2, a known arrangement is illustrated, in which the light emitter 10, such as a VCSEL, is attached to a carrier 12, and the ends of optical fibers (not shown) are embedded within an optical coupler 14. In this conventional arrangement, the carrier 12, rather than the light emitter 10, is directly attached to the optical coupler 14. Moreover, it is understood that the light emitter is conventionally formed on a top surface of a chip. For explanatory purposes, both the light emitter and the associated chip are collectively referred to as light emitter 10.

The carrier 12 is typically molded or otherwise constructed from a thermally-conductive material, such as copper, to help dissipate heat generated by the light emitter 10. Moreover, the carrier 12 is conventionally provided with two contact surfaces 16, separated from each other by a well 18. The well 18 accommodates the chip having the light emitter thereon. Typically, the chip is adhered to the carrier 12 using an epoxy or other adhesive disposed in a bottom of the well 18. Moreover, an end face of the optical coupler 14 has a middle active region, in which the optical fibers are disposed. When the carrier 12 is attached to the optical coupler 14, the two contact surfaces 16 of the carrier will be disposed on either side of the middle active region of the optical coupler 14, so that the light emitter(s) 10 can be aligned with the optical fibers.

Moreover, since the carrier 12 is typically formed of copper, the carrier can be utilized to serve as a return electrical path for the light emitter 10. That is, an electrically conductive epoxy can be utilized to adhere the chip to the carrier 12, so that current passes from the light emitter 10 via the electrically conductive epoxy, into the carrier and subsequently transmitted elsewhere by utilizing, for example, electrical conductors on a flexible cable.

In order to assist in the accurate positioning and alignment of the light emitter 10, it is conventional to polish the various contacting surfaces (the end face of the optical coupler 14 and the contact surfaces 16 of the carrier) to be very flat, i.e., about two microns from peak to valley. Moreover, the chip has a known and defined thickness, and likewise has upper and lower surfaces that are very flat. Thus, when the chip is attached within the well 18, and the carrier 12 is attached to the end face of the optical coupler 14, a gap 20 having a known size will be formed between an upper surface of the light emitters 10 on the chip and the end face of the optical coupler. This gap 20 has conventionally been deemed necessary to prevent damage to the light emitter 10 during the alignment process.

However, each of the adjoining surfaces has a tolerance associated therewith. That is, the dimensions of the depth of the well 18, the thickness of the chip, the thickness of the epoxy or other adhesive used to attach the chip to the bottom of the well, and the surface flatness of the end face of the optical coupler 14 and the contact surfaces 16 of the carrier due to manufacturing tolerances, can vary. These tolerances are cumulative, so that the total accumulated tolerance is about 50 microns, with the resulting gap being between about 75 and 125 microns. This gap is relatively large, and will allow for a substantial divergence of the light beam, thus requiring complex active alignment techniques, and possibly reducing the amount of light that can be received by the optical fibers. Thus, there is a need for a coupling arrangement for an optoelectronic transducer, in which the gap is minimized so as to reduce the divergence of the emitted light.

Moreover, it is also known to utilize a lens in the coupling arrangement, to help focus the emitted beam down. However, using a lens is complicated and costly. Thus, there is a need for a coupling arrangement for an optoelectronic transducer, which reduces the divergence of the emitted light without requiring a lens to do so.

Moreover, it is also known to attach a chip directly (i.e., with no gap) to a mount which includes optical fibers therein (i.e., an optical coupler). For example, in U.S. Pat. No. 4,730,198 issued to Brown et al., it is disclosed that after aligning the chip with the optical fibers, the chip is held in place by application of a transparent epoxy or solder located between the chip and the mount. In this scenario, the chip is held against the end face of the mount in a so-called hard stop arrangement. That is, the chip is pushed against the mount until the two components are in direct contact with one another, at at least two different points. However, this arrangement is disadvantageous in that during alignment, the chip will be moved relative to the end face of the mount. Since the chip is in direct contact with the mount, it is possible that the surface of the chip will be damaged due to its engagement with the mount during its relative sliding motion. Thus, although this known arrangement allows for the gap between the chip and the mount to be reduced, because the alignment technique is performed prior to the application of the epoxy, it is very possible that the chip will be damaged during the alignment process. Thus, there is a need for a method and arrangement that will reduce the gap between the chip and the optical coupler, and which will allow the chip to be aligned without damage thereto.

SUMMARY OF THE INVENTION

It is, therefore, a principle object of this invention to provide an enhanced coupling arrangement for an optoelectronic transducer.

It is another object of the invention to provide an enhanced coupling arrangement for an optoelectronic transducer that solves the above mentioned problems.

These and other objects of the present invention are accomplished by the enhanced coupling arrangement for an optoelectronic transducer disclosed herein.

According to one aspect of the invention, a carrier is provided in which the conventional bonding surfaces have been either reduced in size or removed. A surface emitter, such as a VCSEL, is attached to the carrier, in a conventional manner. However, instead of attaching an optical coupler to the contact surfaces of the carrier, this exemplary aspect of the invention utilizes an adhesive, such as a urethane acrylate or epoxy resin, to couple the optical coupler to the surface emitter. In the exemplary embodiment, urethane acrylate (628 series), manufactured by Dymax (™) Corporation, of Torrington, Conn. was utilized. This urethane acrylate has a nominal viscosity of 650 cP (centipoise), and is cured with either UV or visible light, heat or activator.

Because of the viscosity of the adhesive, if a predetermined amount of force is applied between the optical coupler and the surface emitter, the adhesive will advantageously serve as a viscous, lubricating medium, so as to act as a bearing layer, and will prevent the surface of the surface emitter from coming in direct contact with the optical coupler. Thereafter, the optical coupler and the surface emitter can be aligned using either active or passive alignment techniques, without concern as to whether or not the optical coupler will damage the surface of the surface emitter. After alignment, the adhesive is cured, to affix the surface emitter to the optical coupler.

In a further aspect of the invention, the adhesive will include a plurality of small balls, each of which has a diameter of the preferred gap, for example, 10 microns or so. The balls advantageously ensure that if too much force is applied between the optical coupler and the surface emitter, some of the adhesive will remain in place therebetween. Moreover, the balls ensure that a parallel relationship will result between the active region of the optical coupler and the surface emitter. Furthermore, during alignment, the balls will tend to roll, so that the balls will serve as a bearing surface, which will not damage the surface emitter.

In a further aspect of the invention, the balls are made of a translucent material, such as glass or plastic, and will have an index of refraction which is substantially similar to the index of refraction of the adhesive. This ensures that the balls will not introduce additional scattering and potential loss of light.

Moreover, in a further aspect of the present invention, the balls may be comprised of a glass base and coated with a plastic coating. The glass base would serve as a relatively stiff base, but since the glass would be coated with the plastic, the glass would not destroy or degrade the surface of the surface emitter if pressed too hard. Instead, the plastic would serve as a buffer layer, which would act as a cushion. On the other hand, the underlying glass base would be substantially stronger than a pure plastic ball, which may become distorted if pressed too hard.

In another aspect of the invention, the balls may be disposed within a non-adhesive carrier. After the balls are used to establish the gap, an adhesive could then be applied to fix the surface emitter to the optical coupler.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, in the application, the terms "upper", "lower", "front", "back", "over", "under", and similar such terms are not to be construed as limiting the invention to a particular orientation. Instead, these terms are used only on a relative basis.

Figure 1:
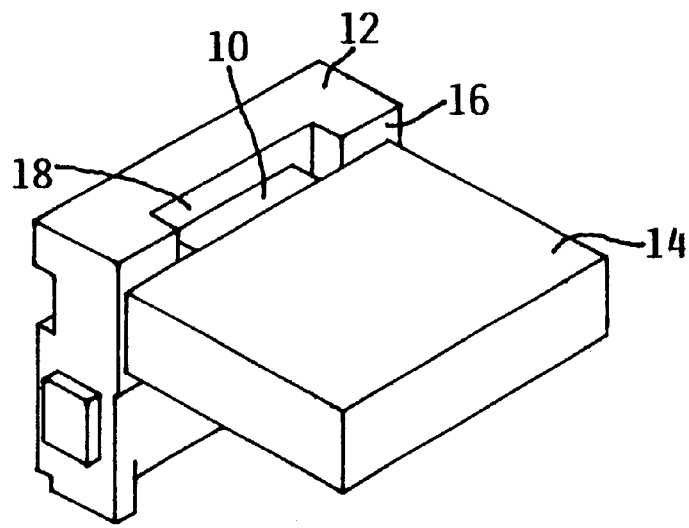
FIGS. 1 and 2 are perspective and top-down views, respectively, of a conventional coupling arrangement for an optoelectronic transducer.
Figure 2:
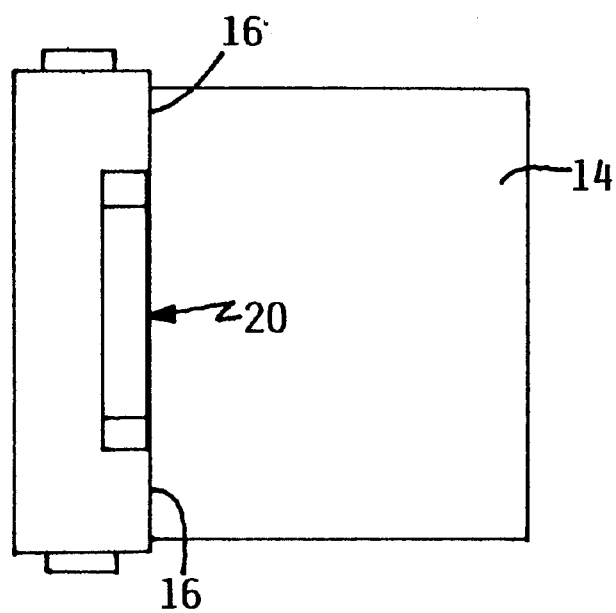
Figure 3:
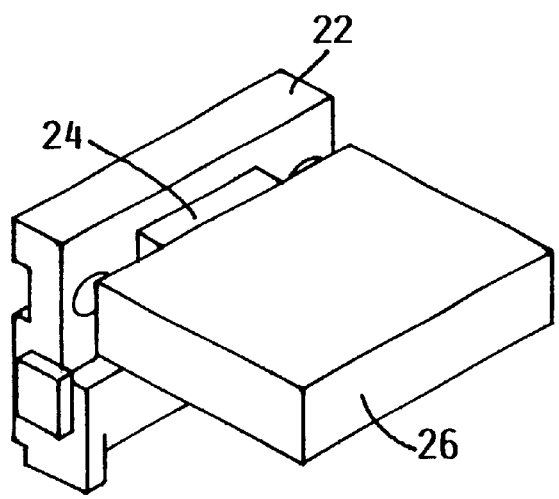
FIGS. 3 and 4 are perspective and top-down views, respectively, of the coupling arrangement according to the present invention.
Figure 4:
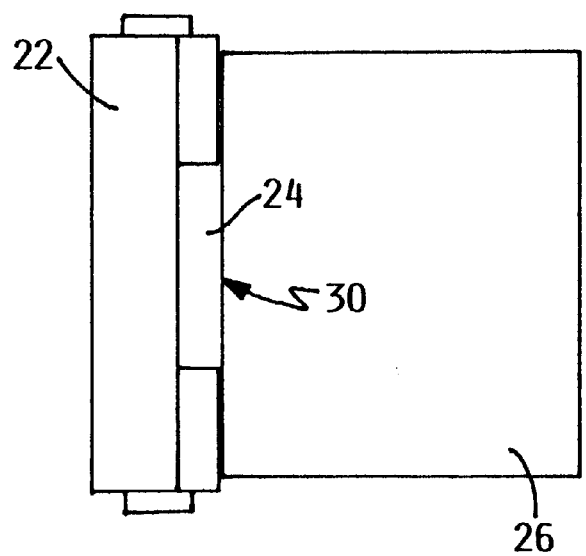

Referring to FIGS. 3 and 4, the present invention utilizes a carrier 22 in which the conventional contact surfaces have been either reduced in size or removed. As show in the Figures, a surface emitter 24 is formed on a chip (not separately referenced), and in the exemplary embodiment, is a VCSEL (vertical cavity surface emitting laser). The surface emitter 24 is attached to the carrier 22, in a conventional manner. Although only one surface emitter is being used as an example, it is understood that a plurality of surface emitters may be arranged in an array on a common surface of the chip. Each surface emitter emits its own respective optical signal.

Figure 5:
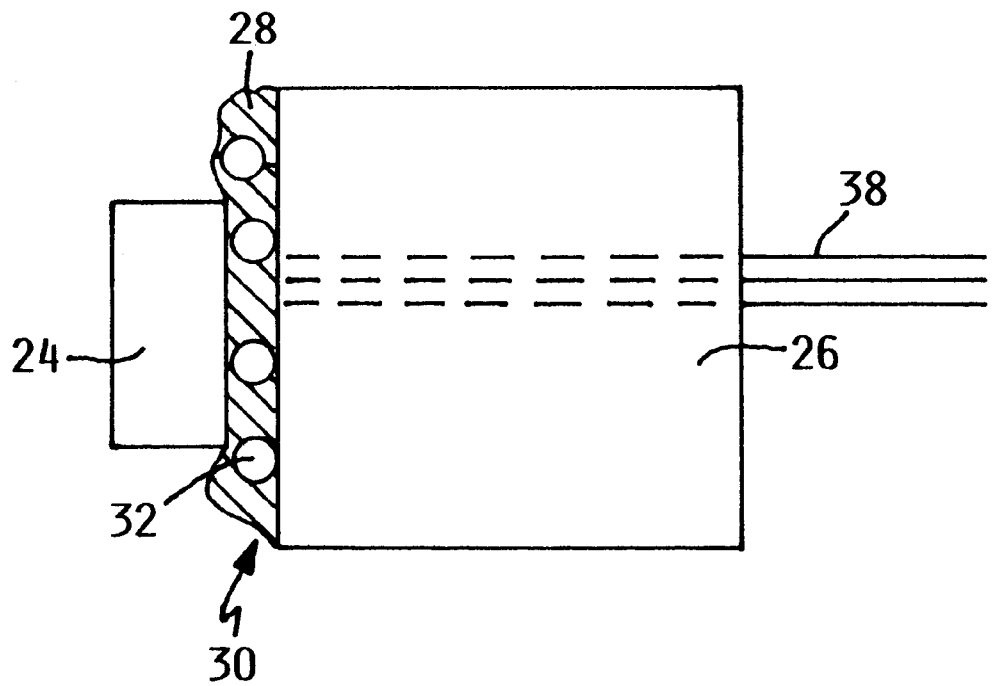
FIG. 5 is a top-down view showing the gap, adhesive and balls between the light-emitter and optical coupler of FIGS. 3 and 4.

In the exemplary embodiment, instead of attaching an optical coupler 26 to contact surfaces of the carrier in the conventional manner, the present invention utilizes an adhesive 28 (see FIG. 5), such as a urethane acrylate or epoxy resin, to couple the optical coupler 26 to the surface emitter 24. In the exemplary embodiment, urethane acrylate (628 series), manufactured by Dymax (™) Corporation, of Torrington, Conn. was utilized. This urethane acrylate has a nominal viscosity of 650 cP (centipoise), and is cured with either UV or visible light, heat or activator.

Because of the viscosity of the adhesive 28, if a predetermined amount of force is applied between the optical coupler 26 and the surface emitter 24, the adhesive 28 will serve (in an uncured state only) as a viscous, lubricating medium, so as to act as a bearing surface, and will prevent the surface of the surface emitter from coming in direct contact with the optical coupler. For example, when the exemplary urethane acrylate adhesive is utilized, it has been determined that one pound of force may be applied between the optical coupler 26 and the surface emitter 24, to form a gap 30 therebetween of about 10 microns. Of course, if an adhesive having a different viscosity is utilized, then the amount of force may need to be modified, in order to achieve the desired gap. Thereafter, the optical coupler 26 and the surface emitter 24 can be aligned using either active or passive alignment techniques, without concern as to whether or not the optical coupler will damage the surface of the surface emitter. However, it is contemplated that since the gap is significantly reduced, passive alignment techniques may advantageously be utilized, due to the low divergence of the emitted light. After alignment, the adhesive 28 is cured, to affix the surface emitter 24 to the optical coupler 26.

Figure 6:
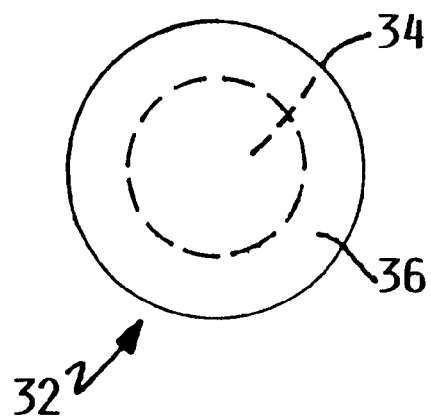
FIG. 6 is an enlarged view of the ball shown in FIG. 5.

Moreover, and referring also to FIG. 6, in an exemplary aspect of the present invention, it is also contemplated that the adhesive 28 will include a plurality of small balls 32, each of which has a diameter of the preferred gap, for example, 10 microns or so. The balls 32 ensure that if too much force is applied between the optical coupler 26 and the surface emitter 24, some of the adhesive 28 will remain in place therebetween. Moreover, the balls 32 ensure that a parallel relationship will result between the active region of the optical coupler 26 and the surface emitter 24. Furthermore, during alignment, the balls 32 will tend to roll, so that the balls will serve as a bearing surface, and will not damage the surface emitter 24.

Preferably, the balls 32 are made of a translucent material, such as glass or plastic, and will have an index of refraction (i.e., the ratio of the speed of light in a vacuum divided by the speed of light in the material) which is substantially similar to the index of refraction of the adhesive 28. For example, the index of refraction of the two different materials will be within an index of 0.05 or so. In contrast, if the index of refraction of the two materials is substantially different, the balls may introduce additional scattering and potential loss of light.

Moreover, in a further aspect of the present invention, the balls 32 may be comprised of a glass base 34 and coated with a plastic coating 36. The glass base 34 would serve as a relatively stiff base, but since the glass would be coated with the plastic 36, the glass would not destroy or degrade the surface of the surface emitter 24 if pressed too hard. Instead, the plastic 36 would serve as a buffer layer, which would act as a cushion. On the other hand, the underlying glass base 34 would be substantially stronger than a pure plastic ball, which may become distorted if pressed too hard.

Additionally, it is also contemplated that the balls may be disposed within a non-adhesive carrier. After the balls are used to establish the gap, and the optical coupler and surface emitter are aligned, an adhesive could then be applied to fix the surface emitter to the optical coupler.

Thus, as is apparent from the aforementioned discussion, by utilizing the viscosity of the adhesive and/or the balls within the adhesive, the present invention allows a surface emitter to be aligned relative to an optical coupler without damage to the surface emitter, while reducing the gap therebetween to a minimum. As an alternative to the balls 32, it is also contemplated that the surface of the surface emitter 24 and the surface of the optical coupler 26 may be maintained in parallel planes using mechanical jigs (not shown), for example. For instance, one of the two devices, such as the surface emitter 24, could be held in a remote center compliance device. This is a device in which constrained movement is allowed. As the forces act upon the two surfaces, the viscous adhesive will be forced out from the gap between the surface emitter and the optical coupler, allowing the two devices to be brought relatively close together. Thus, the gap is controlled by the force applied, the viscosity of the adhesive and the surface areas that are common to both devices (the common surface areas is in the range between 2 mm$^2$ and 50 mm$^2$ and in the exemplary embodiment, is about 3 mm$^2$).

Although the present invention has been utilized by way of example in connection with an optical coupler 26 that contains optical fibers 38 therein, the present invention can also be utilized with any type of optical device which presents a flat surface to the surface emitter. For example, the present invention could be utilized with a lens array, or any other optical device, which is used to collect light and transmit it.

It should be understood, however, that the invention is not necessarily limited to the specific arrangement and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

What is claimed is:

1. A coupling arrangement, comprising:
   at least one surface emitter; and
   an optical coupler coupled to said surface emitter, said optical coupler receiving light emitted from a surface of the surface emitter; wherein said surface emitter is separated from said optical coupler by a gap, the gap being less than about 50 microns, and greater than zero microns; and
   a plurality of balls disposed in the gap between the emitter and the optical coupler.

2. The coupling arrangement recited in claim 1, wherein said optical coupler is free of direct contact with said surface emitter.

3. The coupling arrangement recited in claim 1, wherein the gap is about 10 microns.

4. The coupling arrangement recited in claim 1, wherein said surface emitter is a vertical cavity surface emitting laser.

5. The coupling arrangement recited in claim 1, wherein said optical coupler includes at least one optical fiber which receives the light emitted from said at least one surface emitter.

6. The coupling arrangement recited in claim 1, further comprising an adhesive disposed in the gap.

7. The coupling arrangement recited in claim 6, wherein said adhesive comprises a urethane acrylate curable material.

8. The coupling arrangement recited in claim 1, wherein each of said balls has a diameter, and wherein the diameter of the balls defines a size of the gap.

9. The coupling arrangement recited in claim 8, wherein each of said balls has a diameter of about 10 microns.

10. The coupling arrangement recited in claim 1, wherein each of said balls comprises a glass base.

11. The coupling arrangement recited in claim 10, wherein each of said balls further includes a plastic coating surrounding a respective glass base.

12. The coupling arrangement recited in claim 1, further comprising an adhesive disposed in the gap for coupling said surface emitter to said optical coupler, wherein said balls are disposed within said adhesive.

13. The coupling arrangement recited in claim 12, wherein said adhesive and said balls are translucent, and wherein said adhesive and said balls have essentially a same index of refraction.

14. The coupling arrangement recited in claim 1, further comprising a carrier having said surface emitter affixed thereto, said surface emitter being sandwiched between said carrier and said optical coupler.

15. The coupling arrangement recited in claim 14, wherein said carrier is formed of copper.

16. A method of coupling a surface emitter to an optical coupler, comprising:
    placing a viscous material between a surface emitter and an optical coupler, the viscous material having a viscosity of about 650 cP;
    using the viscous material to establish a gap between the surface emitter and the optical coupler by exerting a force between the surface emitter and the optical coupler of about 1 pound; and
    after said placing, aligning the surface emitter relative to the optical coupler.

17. The method recited in claim 16, wherein the gap is maintained during said aligning, so that the surface emitter does not directly contact the optical coupler.

18. The method recited in claim 17, further comprising, after said aligning, curing the viscous material to adhere the surface emitter to the optical coupler.

19. The method recited in claim 16, wherein said aligning is a passive alignment operation.

20. The method recited in claim 16, wherein the viscous material is a curable adhesive.

21. The method recited in claim 20, wherein the viscous material is urethane acrylate.

22. The method recited in claim 16, wherein said aligning uses the viscous material as a bearing layer to establish a floating contact between the surface emitter and the optical coupler.

23. A coupling arrangement, comprising:
    a vertical cavity surface emitting laser;

a carrier having said vertical cavity surface emitting laser affixed thereto;

an optical coupler coupled to said vertical cavity surface emitting laser, and having a plurality of optical fibers which receive light emitted from said vertical cavity surface emitting laser, wherein said vertical cavity surface emitting laser is separated from said optical coupler by a gap and is free of direct contact with said optical coupler, the gap being less than about 50 microns, and greater than zero microns; and a curable adhesive disposed in the gap for coupling said vertical cavity surface emitting laser to said optical coupler, said adhesive having a viscosity that defines a size of the gap, the viscosity being about 650 cP, so that when a force of about 1 pound is applied between the vertical cavity surface emitting laser and the optical coupler, the gap is formed.

* * * * *